United States Patent
Ostwald

[15] 3,638,768
[45] Feb. 1, 1972

[54] HYDROSTATIC BRAKE

[72] Inventor: Fritz Ostwald, Buchschlag, Germany

[73] Assignee: International Telephone and Telegraph Corporation, New York, N.Y.

[22] Filed: Mar. 26, 1970

[21] Appl. No.: 22,853

[30] Foreign Application Priority Data

Mar. 29, 1969 Germany..................P 19 16 333.8

[52] U.S. Cl.................................188/294, 74/60
[51] Int. Cl....................................F16d 57/06
[58] Field of Search..............188/290, 291, 294, 295; 74/60; 91/501; 417/269, 270

[56] References Cited

UNITED STATES PATENTS

| | | | |
|---|---|---|---|
| 1,741,875 | 12/1929 | Paul | 188/294 |
| 3,033,047 | 5/1962 | Uchida | 74/60 |
| 1,517,386 | 12/1924 | Almen | 74/60 |
| 3,138,067 | 6/1964 | Cadiou | 74/60 X |
| 3,418,942 | 12/1968 | Partos | 417/269 |
| 1,128,697 | 2/1915 | Levy | 239/8 |
| 3,183,110 | 5/1965 | Aler et al. | 106/287 |

FOREIGN PATENTS OR APPLICATIONS 621,355   6/1961   Canada..................417/270

*Primary Examiner*—George E. A. Halvosa
*Attorney*—C. Cornell Remsen, Jr., Walter J. Baum and Paul W. Hemminger

[57] ABSTRACT

A hydrostatic brake having a swashplate which actuates a series of circularly spaced pistons movable in cylinders having energy dissipating suction and discharge valves. The angle of the swashplate is variable in response to a brake signal to increase the stroke of the pistons and thereby the load on the shaft rotating the swashplate.

8 Claims, 2 Drawing Figures

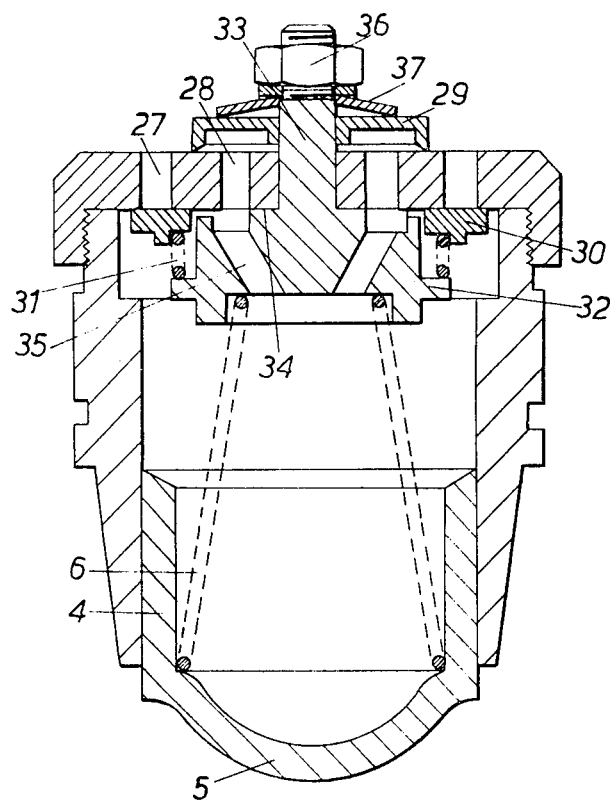

HYDROSTATIC BRAKE

BACKGROUND OF THE INVENTION

1. Field of the Invention hydrostatic

The invention relates to brakes and particularly to hydrostatic brakes or retarders adapted for use on road vehicles.

2. Description of Prior Art

Although various systems of pure hydraulic braking for automobiles are known none of these systems provides the combination of wear-free operation which is usual with pure hydraulic braking and the high brake torque and quick reaction characteristic associated with hydraulically actuated mechanical friction automotive brakes which are subject to wear.

The terms hydraulic, hydrodynamic or hydrostatic brake are used herein to mean a brake in which the rotational energy of the shaft being braked is transmitted to a fluid and then dissipated as opposed to the hydraulically actuated mechanical friction brake used on most automobiles.

In the hydrostatic brake for vehicles disclosed in German Pat. No. 1,090,117 two piston drums, each having a plurality of circumferentially spaced cylinders with pistons, are driven by a common power source, the pistons, which reciprocate in an axial direction while rotating with the piston drums, act upon swash or wobble plates to drive two parallel shafts. The cylinders are interconnected by two channel systems and the pistons convey the hydraulic fluid against an excess pressure accumulated in the channel system. This device has an undesirable brake torque characteristic at high rotary speeds. Due to the planetary gear connection for driving the piston drums, there are considerable friction losses in this device when the hydrostatic gear is idling without producing a braking effect.

The device for braking vehicles shown in German Pat. No. 1,125,300 is equipped with a hydrostatic gear consisting mainly of an axial piston pump driven by the driving engine, e.g., an internal-combustion engine of the vehicle, and of an axial piston motor driving the actuation shaft of the vehicle. The axial piston pump and the axial piston motor communicate with each other through a closed hydraulic main circuit which is formed by a high-pressure line leading from the pump to the motor and a low-pressure line leading from the motor to the pump. From the low-pressure line a branch line leads to the high-pressure line bypassing the pump. In the branch line the energy of the hydraulic medium which is produced by the motor operating as pump when driving downhill is completely or partly transformed. In this condition part of the main circuit passing through the brake is blocked and means are provided to swing the hydrostatic axial piston motor in order to achieve different braking effects during brake actuation. Further means are provided to keep the axial piston pump in the normal position at the same time to block the main circuit.

In hydraulic brake systems both control ratios according to size should have approximately the value 100 in order to avoid unnecessary idle power at high rates of revolutions and, on the other hand, to achieve a high brake torque at low vehicle speeds with correspondingly low wheel speeds. The ratio of brake torque to actuating force is very high for the conventional friction brake while the ratio is substantially lower for a hydraulic brake which is controlled by the flow of hydraulic fluid. The reaction time in the conventional friction brakes is very short and when braking is performed by means of a hydrostatic machine it should not be greatly increased or else adaptation to dynamic variations of the wheel load would become much more difficult as far as the control of braking force and brake slip is concerned. Obtaining a high, relatively constant ratio of brake torque to actuating force is not easily achieved in conventional friction brakes because of the fluctuation of the coefficient of friction and in hydrodynamic machines controlled by the flow of hydraulic fluid because of the fluctuation in the hydraulic fluid and various operating conditions. In order to obtain steady brake torque independent of wheel speed the curve of brake torque, as a function of wheel speed, should be as close as possible to a horizontal straight line without sharp curves.

SUMMARY OF THE INVENTION

This invention achieves the desirable characteristics discussed above by providing a hydrostatic brake having a wobble or swash plate rotating with the shaft to be braked and a series of circumferentially spaced working cylinders with pistons which are actuated by the wobble plate. The angle of the wobble plate with respect to the shaft is variable as a function of the brake-actuating pressure. The housing is filled with pressure medium and the working cylinders are connected with throttling points or valves for the supply and discharge of the pressure medium moved by the working cylinders. These connections lead into the chamber enclosed by the machine housing. Further, the device has channels for the supply and discharge of pressure medium in the machine housing. Advantageously the brake torque is controlled by the changing position of the wobble plate while the relief pressure valve is invariably set. The wobble plate rotating with the shaft is arranged coaxially to the machine shaft between two drums with a set of working cylinders.

Each working cylinder is provided with a spring-loaded inlet valve and a spring-loaded outlet valve which serves at the same time as relief pressure valve.

According to the invention the working cylinders are held around the shaft in bores of a cylinder plate, the plate being clamped between housing parts. Expediently the wobble plate is displaced by axial shifting of a coaxially arranged cam ring rotating with the shaft. For this purpose the cam ring is displaced by a coaxially arranged cylindrical hydraulic actuator which is connected to the brake-actuating device. Naturally, the cam ring can be moved also by a single-hydraulic cylinder instead of a ring cylinder. In cases where the brake is actuated by a mechanical linkage system a coaxially arranged screw socket with coarse thread can be provided to shift the cam ring.

According to the invention the inlet and outlet valves of the cylinders of the piston drums lead into the interior of the machine housing. The interior is connected with a heat exchanger by means of two pressure medium connections. Preferably valves with a horizontal pressure characteristic are used as relief pressure valves. Of course, the two piston drums are staggered under a certain angle in order to increase the degree of uniformity. All working cylinders can be connected via an outlet check valve to a joint line whose pressure is controlled by a single-relief pressure valve.

In order to reduce the weight of the brake system it is advantageous to make the machine shaft hollow. Further it is possible without difficulties to arrange the device for the displacement of the wobble plate in the interior of the machine shaft.

BRIEF DESCRIPTION OF THE DRAWINGS

FIG. 2 is a longitudinal sectional view through one of the working cylinders arranged in the brake device.

DESCRIPTION OF THE SPECIFIC EMBODIMENTS

Figure 1:
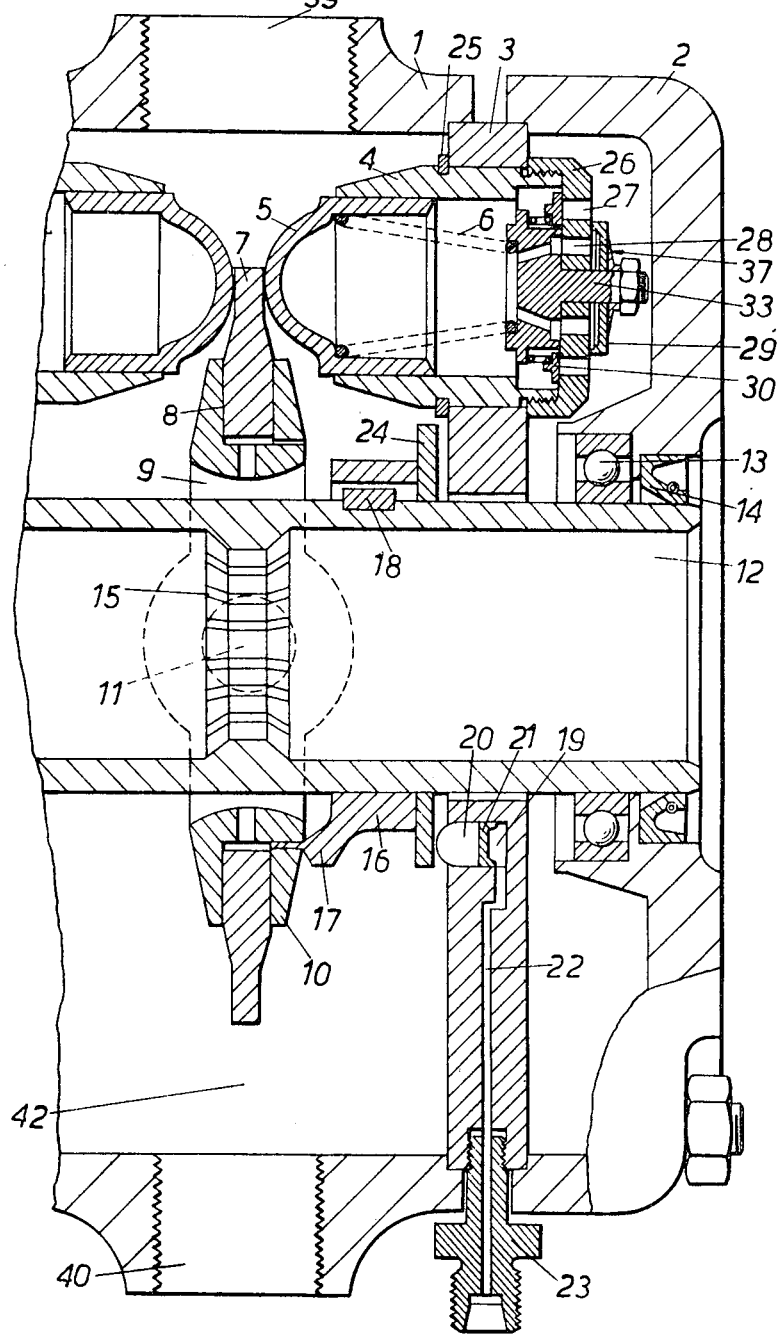
FIG. 1 is a partial sectional view of a brake device according to the invention.

Referring to the figures there is shown a housing having a central part 1, two side parts 2 and two cylinder mounting plates 3, each clamped between one side part and the central part of the housing. Each cylinder mounting plate has a plurality of circumferentially spaced perforations through which are mounted the cylinders 4. A piston 5 is mounted in each cylinder and is held against the outer part 7 of the wobble or swashplate by a spring 6. FIG. 1 illustrates an embodiment with two oppositely disposed piston drums with the cylinders 4, the pistons 5 and the springs 6. The outer ring 7 of the wobble plate is connected with the inner part 9 through a guide bearing 8 which is designed as a sliding bearing.

An operation free from play can be set by a threaded disc 10 which is secured against torsion in a way not illustrated.

The inner part 9 of the wobble plate is attached to the machine shaft 12 by means of two pivot pins 11 arranged on said shaft thus allowing the part 9 to swing around the shaft. The machine shaft 12 is hollow and is supported by roller bearings 13 in the housing 1, 2 and sealed by gaskets 14. The shaft can be driven by a splined shaft engaging the splines 15.

The ring 16 having a cam 17 is slidable on the machine shaft but prevented from rotating with respect to the shaft by the key 18. In the cylinder mounting plate 3 a piston 20 with the seal 21 can move in longitudinal direction in the cylinder bore 19. The cylinder bore 19 is connected to a pressure source, such as a hydraulic line of a vehicle brake, by means of the channel 22 in the cylinder mounting plate and the fittings 23. A pressure plate 24 transmits the movement of the piston to the ring 16.

Upon brake actuation the piston movement is transmitted to the wobble plate via the pressure plate 24 and the cam ring 16 to effect a change in the angle between the wobble plate and the drive shaft.

Each cylinder 4 is held in a perforation in the cylinder plate 3 by means of a snap ring 25 fitted in a groove in the outside of the cylinder on one side of the plate 3 and a cylinder cap 26 on the other side of the plate which also serves as valve plate. The valve plate has an inlet opening 27 and an outlet opening 28 which can be closed by the suction valve ring 30 and the discharge valve ring 29. The weak suction valve spring 31 bears against a collar 32 on the threaded member 33 and keeps the suction valve ring in the closed position shown in the drawing. The bores 35 serve to connect the cylinder chamber with the discharge opening 28.

The valve plate 29 is guided centrally and cylindrically on the shank of the member 33 and is pressed against the cylinder cap 26 by means of the nut 36 and the spring washer 37 with force which is adjustable to make the valve serve as relief pressure valve. By proper selection and design of the spring 37, the discharge valve ring 29 and the suction valve ring 30 any desired relation between the pressure and the conveyed quantity can be attained.

The concentric arrangement of these valves allows a simple and inexpensive quantity production of these parts which can be punched or turned. When the cylinder mounting plates 3 are furnished with an odd number of cylinders, the cylinder plates, when fitted between the housing 1 and the side part 2, can be turned so that the pistons are not arranged right opposite each other. In this way it is possible to reduce vibration and provide for a smoother operation.

The central part of the housing 1 has connection bores 39 and 40, preferably one on top and one at the bottom, through which a communication with a heat exchanger or cooler is established via connecting lines.

The circulation of the cooling agent can be of the thermosyphon type, i.e., it can be initiated by sealing differences between the machine and the cooler or it is possible to provide some kind of a booster pump to assist the circulation of the fluid.

The operation of the machine as a vehicle brake is the following: By means of a splined shaft which can be either the driving shaft of a vehicle wheel or the shaft of the vehicle transmission, the machine shaft 12 is connected with one or more vehicle wheels. The wobble plate is kept in the central position shown in the drawing by means of piston springs 6.

When the machine shaft 12 is turned the outer wobble plate ring 7 is held by frictional contact between the the pistons so that only the inner part 9 of the wobble plate rotates in the guide bearing 8.

In this case the idle power of the machine consists only of the bearing friction and the sealing friction and therefore it is neglectably small notwithstanding the high rotary speeds.

When the piston 20 is actuated for braking by the pressure of a conventional hydraulic vehicle brake via the supply channel 22 and the fitting 23 and thus the wobble plate displaced, as described above, from the initial position into working position a brake torque results which consists of the following factors:

1. Hydraulic work by suction and displacement against a fixed pressure of the relief pressure valve in each cylinder.
2. Loss of efficiency due to the rotation of the wobble plate in the fluid. 3. Bearing friction in the guide bearing of the wobble plate.

The largest part of the braking effect results from the pressure release at the relief pressure valve which produces heat. The efficiency is proportional to the fixed pressure of the relief pressure valve and the conveyed quantity which, in turn, depends on the piston stroke, i.e., the angle of inclination of the wobble plate and the rate of revolutions. In case a relief pressure valve is used which operates independently of the conveyed quantity the brake torque depends only on the angle of inclination of the wobble plate.

Very little force is necessary to change the position of the wobble plate when the position of the swivel axis is well chosen in the known manner so that this brake system as the third brake of a vehicle can be controlled without difficulty by an already existing hydraulic brake-actuating system.

Since there are no members having a significant time delay when the system is properly vented the braking effect start immediately when the initial position of the wobble plate is changed.

I claim as my invention:

1. A hydrostatic brake comprising,
   a housing having a shaft rotatably mounted therein, a swashplate rotatably with the shaft, a plurality of transducers including cylinders for converting mechanical movement into movement of hydraulic fluid, the transducers being mounted in the housing in a circle with the axes of the cylinders being parallel to the shaft so that the transducers are actuated as the swashplate rotates, means for supplying hydraulic fluid to the transducers, means for throttling the flow of fluid from the transducers to dissipate energy, and means for varying the angle between the swashplate and the shaft in response to a braking signal whereby a variable braking load will be applied to the shaft, the transducers each having a piston which is spring biased against the swashplate and spring-biased suction and discharge valves for restricting the flow of hydraulic fluid to and from the cylinders, the means for varying the angle between the swashplate and the shaft including a pivot mounting the swashplate on the shaft, an axially slidable ring rotatable with the shaft, the ring having a cam adapted to contact the swashplate and turn the plate about its pivot and an actuator responsive to a brake signal for moving the ring toward the swashplate, the actuator being a hydraulic piston responsive to a brake pressure signal.

2. A hydrostatic brake
   for rotating shafts comprising, a wobble plate rotating with the shaft, the plate having an inner disc part which can be turned to change the angle of the plate with respect to the shaft and an outer nonrotating ring supported on the inner disc by a bearing, a housing forming a chamber enclosing the shaft and wobble plate, a series of circularly spaced cylinders mounted in the chamber with the axes of the cylinders being parallel to the shaft, the cylinders having spring-biased pistons held against the side of the outer ring and means for throttling suction and discharge flow between the cylinders and the chamber within the housing and means for varying the angle of the wobble plate in response to a brake signal, the means for varying the angle of the wobble plate comprising; a ring having a cam thereon, the ring being axially movable on the shaft whereby movement of the ring toward the wobble plate decreases the angle between the plate and the shaft and means for moving the ring toward the wobble plate in response to a braking signal, the means for moving the ring comprising a hydraulic actuator responsive to a hydraulic braking signal.

3. A hydrostatic brake for rotating shafts comprising, a wobble plate rotating with the shaft, the plate having an inner disc part which can be turned to change the angle of the plate with respect to the shaft and an outer nonrotating ring supported on the dinner disc by a bearing, a housing forming a chamber enclosing the shaft and wobble plate, a series of circularly spaced cylinders mounted in the chamber with the axes of the cylinders being parallel to the shaft, the cylinders having spring-biased pistons held against the side of the outer ring and means for throttling suction and discharge flow between the cylinders and the chamber within the housing and means including a hydraulic actuator responsive to a hydraulic braking signal for varying the angle of the wobble plate.

4. The hydrostatic brake of claim 1 wherein the cylinders are mounted in perforations in a plate rigidly attached to the housing.

5. The hydrostatic brake of claim 3 wherein the means for varying the angle of the wobble plate comprise; a ring having a cam thereon, the ring being axially movable on the shaft whereby movement of the ring toward the wobble plate decreases the angle between the plate and the shaft and said hydraulic actuator moves the ring toward the wobble plate in response to the hydraulic braking signal.

6. The hydrostatic brake of claim 3 including means for connecting the chamber formed within the housing to a heat exchanger and means for circulating hydraulic fluid between the heat exchanger and the chamber.

7. The hydrostatic brake of claim 3 wherein the means for throttling the discharge flow from the cylinders to the chamber are pressure relief calves having a constant pressure characteristic.

8 The hydrostatic brake of claim 3 including two series of cylinders, one mounted on either side of the wobble plate.

* * * * *